Patented June 4, 1946

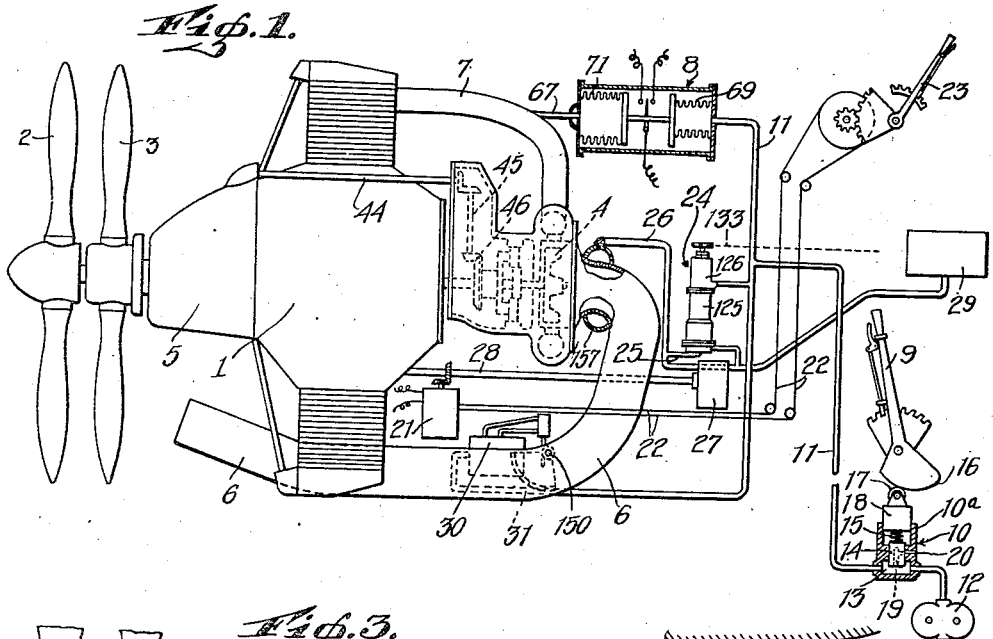

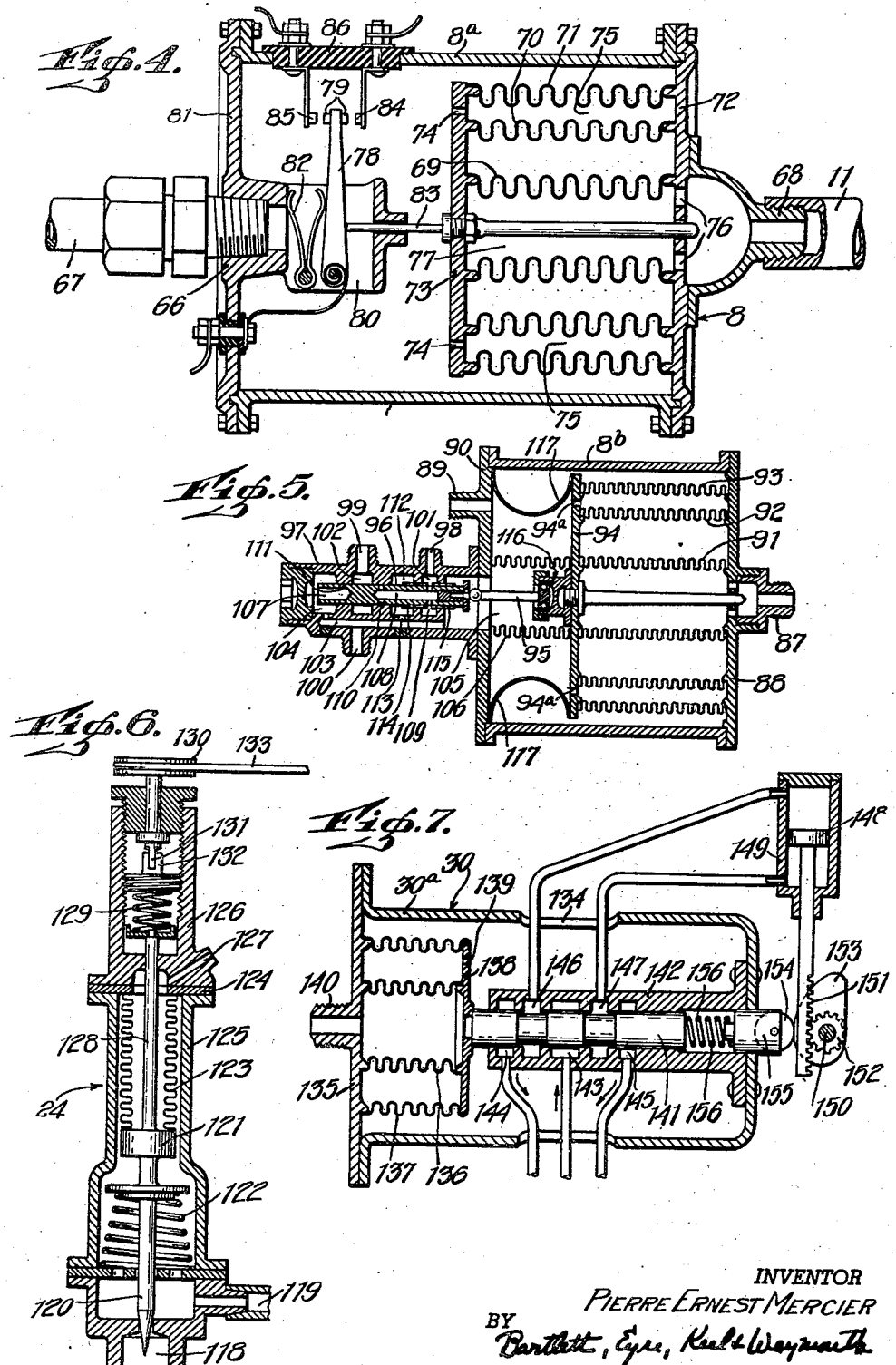

2,401,497

UNITED STATES PATENT OFFICE 2,401,497

CONTROL SYSTEM FOR AIRPLANE POWER PLANTS

Pierre Ernest Mercier, New York, N. Y., assignor to Stratos Corporation, Farmingdale, N. Y., a corporation of Delaware Application October 12, 1943, Serial No. 505,969

17 Claims. (Cl. 170—135.6)

My present invention relates to aircraft power plants and comprises a system for controlling the operation thereof. The new system includes a control of the speed of the supercharger to maintain the optimum pressure in the inlet manifold of the engine according to the conditions of flight, a control of the flow of fuel to the engine, and also a control of the pressure of the air delivered to the supercharger when the airplane is flying with reduced power or at low speed or low altitude.

In an application Serial No. 498,034, filed August 10, 1943, I have disclosed and claimed transmission mechanism for driving counter-rotating propellers and an auxiliary shaft from the engine shaft in such manner that the rotating speeds of the propellers and of the auxiliary shaft do not bear fixed ratios to that of the engine shaft, the rotating speed of the auxiliary shaft being a function of the rotating speeds of the two propellers. In that application the auxiliary shaft was described as driving the supercharger for the engine and an important advantage of the new transmission mechanism was stated to be that it afforded a means whereby the rotating speed of the supercharger could be varied during flight of an airplane. It was suggested, for example, that it would be possible, with the mechanism disclosed therein, to vary the rotating speed of the supercharger by controlling the pitch of one propeller while adjusting the pitch of the other propeller in accordance with the rotating speed of the engine shaft. In my present invention I utilize transmission mechanism of the above mentioned type for maintaining in the engine inlet manifold such pressure as is required for efficient working conditions of the engine. In accordance with this invention the correct pressure in the inlet manifold is obtained by automatic adjustment of the pitch of one propeller in response to the position of the throttle lever. The invention includes also a control of the flow of fuel to the engine in response both to the speed of the engine and to the position of the throttle lever and a control of the pressure of the air delivered to the supercharger.

For a better understanding of the invention reference may be had to the accompanying drawings, of which—

Fig. 1 is a more or less diagrammatic view of an airplane power plant equipped with a control system embodying the invention;

Fig. 2 is a vertical sectional view of a suitable transmission mechanism for use in the system of Fig. 1;

Fig. 3 is a diagrammatic view showing control means and the electrical circuit for adjusting the pitch of electrically controlled pitch propellers;

Fig. 4 is a sectional view of the engine manifold pressure governor of Fig. 1;

Fig. 5 is a sectional view of an engine manifold pressure governor suitable for use with a propeller the pitch of which is controlled hydraulically;

Fig. 6 is a sectional view of the gasoline control device of Fig. 1; and

Fig. 7 is an enlarged sectional view of the air pressure regulator of Fig. 1.

The invention will first be described with reference to Fig. 1, which shows a conventional airplane engine 1, a pair of controllable pitch propellers 2 and 3, and a supercharger 4 for the engine, the propellers and the supercharger being driven from the engine shaft through a transmission mechanism enclosed within a casing 5 and of the type hereinafter described in connection with Fig. 2. The supercharger 4 receives air from the atmosphere through an inlet pipe 6 and delivers air under compression through pipes 7, of which but one is shown in the drawings, to the inlet manifold of the engine. In accordance with the invention a pressure regulator or governor 8, connected to the pipe 7 so as to respond to the pressure in the engine inlet manifold, operates under control of a throttle lever 9 of the airplane to adjust the pitch of one of the propellers. In the particular embodiment of the invention illustrated in Fig. 1, the control of the governor 8 from the throttle lever is effected pneumatically through a device 10 controlling the pressure of a fluid delivered through a pipe 11 to the governor 8, a pump 12 being indicated as the source of fluid pressure. Device 10 may comprise any suitable means for maintaining a pressure in the line 11 corresponding to the position of the throttle lever 9. As shown, the device 10 comprises a casing 10a enclosing a chamber 13, a floating piston 14 within the casing and subject on its lower face to the pressure of fluid in the chamber 13 and on its upper face to a spring 15. The tension of the spring 15 is controlled by the position of the throttle lever 9 through engagement of the lower cammed surface 16 of the throttle lever with a roller 17 mounted on a piston 18 which engages the upper end of spring 15. With the above described construction, when the pressure in chamber 13 exceeds the force of the spring 15 the piston 14 rises until a passage 19 therein registers with a port 20 in the casing 10a, whereupon the pressure in chamber 13 falls due to the leakage from the port 20 until the forces acting on the piston 14 are balanced. Thus the pressure in line 11 will vary accurately with the position of the throttle lever 9. The supply of fuel to the engine is controlled by the pressure in line 11 which in turn, as above described, is controlled by the position of the throttle lever 9.

In Fig. 1 the governor 8 is shown more or less diagrammatically as comprising a pair of opposing bellows the interiors of which are connected respectively with the inlet 7 and control pipe 11. If the propellers 2 and 3 are of the type in which their pitch is controlled electrically, then governor 8 operates upon unbalance of the pressures in the bellows to move a switch arm to close the control circuit of the pitch control mechanism of one of the propellers, the pressure differential determining in which direction the pitch will be varied. For simplicity of illustration only the wires of the control circuit leading into the governor 8 are shown in Fig. 1. The circuit is shown in Fig. 3 and will be described hereinafter.

The control of the pitch of the other propeller by the engine speed is indicated diagrammatically in Fig. 1 by the speed governor 21 which is driven from the engine shaft and controlled through a cord 22 by the speed control lever 23 of the airplane, the speed governor operating upon departure of the engine speed from that set by the control lever to move a switch arm to close the control circuit of the pitch control mechanism of the propeller. Speed governor 21 and the circuit controlled thereby are shown in more detail in Fig. 3.

In order that the supply of fuel be properly adjusted in accordance with the engine speed and with the position of the throttle lever 9, that is to say, according to the absolute pressure in the cylinder, the control system of the invention includes a mechanism 24, shown in detail in Fig. 6, which controls a relief valve in a branch pipe 25 connected to the line 26 supplying fuel to the engine from a constant volume pump 27 driven from the engine by a shaft 28 and to which the fuel is supplied from the gasoline tank 29 of the airplane. As hereinafter described in connection with Fig. 6, this mechanism operates to vary the flow of gasoline through the pipe 25 in response to the pressure in line 11, that is in response to the position of throttle lever 9, and thereby in conjunction with the pump 27 which delivers an output substantially proportional to the engine speed, serves to insure that the pressure of the gasoline delivered to the engine will vary both with the engine speed and with the throttle position.

In addition to the control effected by the pressure governor 8 and by the speed governor 21 and by the mechanism 24, there is provided in the system of Fig. 1 a device 30 which operates under control of the pressure in line 11 to adjust the position of a damper or gate 31 in the air inlet passage 6. When the airplane is flying with small power or at low speed, and particularly if it is flying at low levels, a reduction in the air supplied to the supercharger is advisable. Device 30 operates therefore when the pressure in line 11 drops below a predetermined value as the result of movement of the throttle lever 9 to a partially closed position to move the damper 31 from a wide open position into a position to restrict the flow of air through inlet pipe 6. When the pressure in line 11 exceeds such predetermined value, device 30 operates to hold the damper 31 in the wide open position wherein no resistance is offered to the air flow through the inlet pipe. The structure of device 30, which is shown in Fig. 7, will be described hereinafter.

In order that adjustment of the pitch of one of the propellers by pressure governor 8 will vary the rotating speed of the supercharger and thereby bring the pressure in the inlet manifold to the desired value as determined by the position of the throttle lever 9, it is necessary that a transmission mechanism be employed between the engine shaft on the one hand and the propeller shafts and the drive shaft of the supercharger on the other hand that will effect this result. Such a transmission mechanism is shown in Fig. 2 wherein the engine shaft is indicated by the reference numeral 32, the shaft of propeller 2 by the numeral 33, and the shaft of propeller 3 by the numeral 34. As shown in Fig. 2, the engine shaft 32 carries a conical toothed crown gear 35, and shafts 33 and 34 carry satellite carriers 36 and 37 respectively. Satellite gears 38 (of which one only is shown) carried by the carrier 37 mesh on the one hand with a fixed gear 39 and on the other hand with one gear of a double gear 40 freely mounted on the shaft 33. Satellite gears 41 (of which one only is shown) carried by the carrier 36 mesh on the one hand with the gear 35 and on the other hand with the other gear of double gear 40. Double gear 40 carries a cylindrical gear 42 which meshes with a gear 43 fixed on an auxiliary shaft 44. Shaft 44, as shown in Fig. 1, drives the supercharger 4 through a second shaft 45 and suitable multiplication gearing indicated at 46. If desired, gear 42 carried by double gear 40, may drive another auxiliary as, for example, the movable vanes 47 of a blower, for delivering cooling air to the engine.

With the above described transmission mechanism, the torque available on the engine shaft is divided between the propeller shafts 33 and 34 and the auxiliary shaft 44 and the rotating speed of shaft 44 is maintained proportional to that of propeller shaft 34. Hence the rotating speed of the supercharger may be controlled by adjustment of the pitch of propeller 3. The pitch of propeller 2, as heretofore indicated, is controlled in response to the speed of the engine to insure optimum flight conditions.

In Fig. 3 is shown an electrical circuit suitable for use with electrically controlled pitch propellers for controlling the pitch of propellers 2 and 3 in accordance with the invention. As shown, a battery 48 has one end connected through any conventional fuse box or safety device 49 to the common lead 50 of the usual pitch control reversible motors (not shown) of propellers 2 and 3 and its other end connected to movable switch elements 51 and 52. A pair of electromagnets 53 and 54 control the position of element 51 and a similar pair of electromagnets 55 and 56 control the position of element 52. Energization of electromagnet 53 causes element 51 to engage a fixed contact 57 for closing the circuit of the pitch control motor of propeller 3 in one direction and energization of electromagnet 54 causes element 51 to engage a fixed contact 58 for energization of the pitch control motor of propeller 3 in the reverse direction. Similarly, energization of electromagnet 55 causes energization of the pitch control motor of propeller 2 in one direction by engagement of element 52 with fixed contact 59 and energization of electromagnet 56 causes energization of the pitch control motor of propeller 2 in the reverse direction by engagement of element 52 with fixed contact 60. Energization of electromagnets 53 and 54 is controlled by the pressure governor 8 in response to the engine inlet manifold pressure and the position of the throttle lever and energization of electromagnets 55 and 56 is controlled by the speed governor 21 in response to the engine speed and to the position of speed control lever 23.

As shown, the speed governor 21 includes an annular member 61 which is screw-threadedly mounted on a fixed member 62 and is provided with an external helical groove 63 for reception of turns of the cord 22. The vertical position of member 61 which is thus controlled from the speed lever 23 through the cord 22 determines the compression of a spring 64 acting in opposition to the centrifugal force on the conventional weighted arms 65 of the governor. Thus when the rotating speed of the engine shaft varies from that set by the lever 23, governor 21 operates to close the circuit through one or the other of electromagnets 55 or 56 to thereby cause adjustment of the pitch of propeller 2 in a direction to restore the engine speed to the desired value.

In Fig. 3, as in Fig. 1, the pressure governor 8 has been illustrated more or less diagrammatically. In practice the construction of pressure governor illustrated in Fig. 4 would be employed. As shown in Fig. 4, the governor 8 comprises an airtight casing 8a having a threaded fitting 66 at one end for connection to the pipe 67 leading to the engine manifold and a threaded fitting 68 at its other end for connection to the pipe 11. Three concentric tubular bellows 69, 70 and 71 are secured at one end to the end wall 72 of the casing and at their other end to a plate 73. Plate 73 is provided with one or more restricted orifices 74 connecting the annular chamber 75 between the bellows 70 and 71 with the interior of the casing 8a and end wall 72 of the casing is provided with openings 76 connecting the chamber 77 enclosed by bellows 69 with the fitting 68. The annular space between bellows 69 and 70 is evacuated. Thus plate 73 is subject on one side to the pressure of the gases in the inlet manifold of the engine and on its side over its central area to the pressure in the line 11. A switch arm 78 carrying contacts 79 at one end is pivotally mounted at its other end on a part 80 carried by the end wall 81 of the casing 8a. A spring 82 engages the arm 78 on one side and a rod 83 carried by the plate 73 engages the arm 78 on the other side. Fixed spring contacts 84 and 85 supported by an insulated section 86 of the casing are positioned for engagement by the contacts 79 upon movement of the switch arm. Thus with the above described arrangement, when the pressures acting on plate 73 are in balance, the switch arm 78 is in the open circuit position shown in Fig. 4. Upon an increase of pressure in the engine inlet manifold, for example, plate 73 moves to the right, thus permitting the switch arm to close contacts 79 and 84 which, through the circuit shown in Fig. 3, causes the pitch of propeller 3 to be varied in a direction to decrease the rotating speed of the supercharger and thereby reduce the pressure in the inlet manifold to the desired value. The purpose of the chamber 75 and of the restricted orifice 74 in the plate 73 is to prevent "hunting" or over-travel of the regulating apparatus.

During movement of plate 73 in either direction the pressure in chamber 75, due to the contraction or expansion of the volume of the chamber 75, depending upon the direction of movement of the plate, differs from that in the inlet manifold in a direction tending to oppose further movement of the plate 73 and to thereby restore the switch arm 78 to neutral position prior to the restoration of the balance between the controlling pressures. The chamber 75 and orifice 74 thus prevent "hunting" of the regulator by adding a corrective force which is a function of the rate of movement of the regulating element.

When the system of the present invention is employed with propellers, the pitch of which are controlled hydraulically, a pressure regulator such as shown in Fig. 5 may be employed.

The regulator of Fig. 5, like that of Fig. 4, comprises a casing 8b having a fitting 87 on one end wall 88 for attachment to line 11 and a fitting 89 on the other end wall 90 for attachment to the line leading to the engine inlet manifold. Each of three concentric bellows 91, 92 and 93 is secured at one end to the end wall 88 and at the other end to a plate 94. As in the regulator of Fig. 4, the chamber enclosed by the inner bellows 91 is in communication with the line 11 through orifices in the end plate 88 and the fitting 87, the annular chamber between the inner bellows 91 and the intermediate bellows 92 is evacuated and the outer annular chamber defined by bellows 92 and 93 is in communcation with the engine inlet manifold through restricted orifices 94a in the plate 94 and fitting 89. Movement of plate 94, upon unbalance of the opposing pressure acting thereon, can be arranged to operate any suitable pilot valve controlling the supply of operating fluid to the pitch control mechanism. Preferably, however, the particular construction of pilot valve now to be described is employed. A connecting rod 95 coupled to the plate 94 is connected to a cylindrical member 96. The pilot valve, of which member 96 comprises the piston, includes a cylindrical casing 97 secured to end wall 90 and provided with a port 98 for admission of operating fluid from any suitable source (not shown), a port 99 connected to the propeller pitch operating mechanism (not shown) and a discharge port 100 for the operating fluid. Ports 98 and 99 communicate, respectively, with annular chambers 101 and 102 surrounding the member 96, and port 100 communicates with a longitudinal passage 103 within the casing 97. Passage 103, which communicates at one end with a chamber 104 within which terminates the member 96 and at the other end with a chamber 105 within casing 8b defined by a bellows 106 secured between the plate 94 and end wall 90, serves to equalize the pressures acting on the ends of member 96. Member 96 is provided with two non-communicating longitudinal passages 107 and 108 and with three sets of radial passages 109, 110 and 111 of which passages 109 and 110 communicate with the longitudinal passage 108 and passage 111 communicates with the longitudinal passage 107. With the above described pilot valve, when the parts are in the neutral position illustrated in Fig. 5, operating fluid is neither supplied to, nor drained from, the pitch operating mechanism. If plate 94 moves to the left as the result either of an increase in pressure in line 11 resulting from manipulation of the throttle lever 9 or from a reduction in engine manifold pressure, then member 96 is moved to the left to bring port 110 within chamber 102. Operating fluid then flows from the source through port 98, chamber 101, passages 109, 108 and 110, chamber 102 and port 99 to the pitch operating mechanism to cause the same to decrease the pitch of propeller 3 and hence to increase the rotating speed of the supercharger. Conversely, movement of plate 94 to the right brings passage 111 within chamber 102 and permits drainage of operating fluid from the pitch operating mechanism through port 99, chamber 102, passages 111, 107, chamber 104 and passage 103 to the port 100. As described in connection with the governor of Fig. 4, hunting of the regulator is avoided by the provision of the damping chamber between the bellows 92 and 93 and the restricted orifices 94a.

In order to minimize the effects of friction on the member 96 tending to oppose motion thereof, an annular chamber 112 is provided about the member 96 which is in communication with the passage 103 by means of a radial passage 113 and with chamber 101 through a small helical channel 114 in the member 96 between the chambers 101 and 112. A similar small helical channel 115 of equal and opposite pitch is provided in member 86 between chambers 102 and 105. With this construction, the small leakage of operating fluid through the channels 114 and 115 serves to rotate the member 96 continuously about its longitudinal axis, thus permitting longitudinal displacement to be initiated without frictional resistance. In order to permit such rotational movement of member 96 the connecting rod 95, as shown, is suitably coupled to the plate 94, as by the bearing 116. A jointed connection, as shown, between rod 95 and member 96, allows for any lack of alinement of the center of plate 94 with the longitudinal axis of the member 96. Thin, relatively weak springs 117, symmetrically positioned about the plate 94 and secured thereto and to the end wall 90, help to center and support the plate 94. Similar springs could, and preferably would, be provided in the governor of Fig. 4.

The fuel or gasoline regulator 24 of Fig. 1 will now be described in connection with Fig. 6 to which reference may now be had. The regulator comprises a casing having a gasoline inlet port 118 connected to the line 25 and an outlet port 119 for return of fuel to the inlet side of the pump 27. (See Fig. 1.) The admission of fuel through the port 118 is controlled by a valve 120, the position of which determines the cross sectional area of the port. Valve 120 is carried by a piston 121, the downward movement of which is opposed by a spring 122. A cylindrical bellows 123 is secured at its lower end to the piston 121 and at its upper end to an annular gasket 124 secured between casing sections 125 and 126 of the regulator. Fluid control pressure from pipe 11 is introduced into the bellows 123 through a fitting 127 in the casing section 126. With the above described arrangement, increase in pressure in line 11, resulting from movement of the throttle lever 9, moves the valve 120 downward against the tension of spring 122 to restrict the flow of fuel through the port 118 and thereby increase the fuel supplied to the engine. In order to provide for the manual control of the fuel supply necessary under certain conditions, as for example, at take-off, a piston rod 128, secured to the piston 121 and extending up into casing 126 is engaged at its upper end by a spring 129 the tension of which is adjustable exteriorly of the device by means of a wheel or pulley 130 rotatably mounted in the upper end of the casing, a flattened extension 131 on the shaft of wheel 130 extending into a diametric slot in a member 132 screw-threadedly mounted within the casing section 126 and engaging the upper end of spring 129. With the above described construction, rotation of the wheel 130, as by a cord 133 in a direction to compress spring 129, forces valve 120 toward the closed position irrespective of the pressure in line 11. When the tension of spring 129 is relaxed, control of valve 120 is assumed by the pressure in line 11 acting within the bellows 123.

The governor 30 of Fig. 1 for controlling the damper 31 will now be described in connection with Fig. 7, to which reference may now be had. Governor 30 comprises a casing 30a, open to the atmosphere at 134 and provided with an end wall 135 to which is secured one end of each of two concentric bellows 136 and 137 the other ends of which are connected to a plate or piston 138 having one or more restricted orifices 139 therein. The chamber within bellows 136 is in communication with pipe 11 through the fitting 140 on the end wall 135. Movement of plate 138 upon unbalance of the forces acting thereon moves a valve rod 141 within a cylinder 142 carried by the casing 30a. Cylinder 142 is provided with a port 143 for admission of operating fluid from any suitable source, with exhaust ports 144 and 145 for the operating fluid and with ports 146 and 147 connected through suitable piping to opposite sides of the operating piston 148 of a power cylinder 149. Rod 141, in the neutral position illustrated in the drawing, blocks the flow of operating fluid from port 143 to either of ports 146 or 147. Upon an increase in pressure in line 11, the valve rod 141 is moved to the right to permit operating fluid to flow from the source through ports 143 and 146 to the upper end of cylinder 149 and to be exhausted from the lower end of the cylinder through ports 147 and 145. The resulting downward movement of the piston 148 rotates a shaft 150 through the ratchet 151 and gear 152 secured to the shaft 150.

The damper or gate 31 in the air intake pipe 6 (see Fig. 1) is mounted on the shaft 150 and is rotated toward fully open position by the downward movement of piston 148. Also mounted on the shaft 150 is a cam 153 the surface of which engages a roller 154 carried by a cylindrical plug 155 slidably carried in the end of the cylinder 142. A spring 156 is confined between the end of valve rod 141 and plug 155 for returning the rod 141 to port closing position under the influence of the cam 153. With the above described structure when the pressure in pipe 11 is over a predetermined value the piston 148 remains in the fully lowered position and damper 31 is maintained in the completely open position. At pressures in line 11 below such value, the piston will assume intermediate positions, depending upon both the pressure in line 11 and upon the pressure of the atmosphere acting upon the plate 138 in opposition thereto. As with the pressure governors of Figs. 4 and 5, governor 30 is prevented from "hunting" or over regulating by the provision of the second bellows 137 and the restricted orifice 139 in plate 138.

The operation and construction of the various regulating mechanisms suitable for use in the system of the invention and the system as a whole have now been described. Obviously various changes in the specific structures shown could be made without departing from the spirit of the invention. For example, but one suitable transmission mechanism, that of Fig. 2, has been described and illustrated but any of the mechanisms illustrated in my above mentioned copending application could as well be used as it is only necessary that the transmission mechanism be one which provides for the driving of the supercharger from the engine shaft without a fixed relation between the rotating speed of the supercharger and of the engine shaft whereby variation of the rotating speed of the supercharger can be effected by adjustment of the pitch of one of the propellers. Also, although I prefer to create a master fluid pressure which varies with the position of the throttle lever, as by device 10 for example, and to use such master pressure for controlling the inlet manifold pressure, the fuel supply to the engine and the damper in the air inlet conduit, other means could be provided for controlling these devices from the throttle lever, as for example by cords or chains or electrical means could be provided.

For convenience in the drawings I have indicated, in Fig. 1, the delivery of the fuel through pipe 26 to an annular member 157 positioned about the air admission pipe to the supercharger; the fuel passing through orifices in the pipe into the air stream. The better practice, of course, would be to deliver the fuel to a distributor for synchronous delivery to the different cylinders of the engine. It will be understood, therefore, that the invention contemplates the employment of a distributor, but as the construction thereof forms no part of my present invention it has been deemed unnecessary to complicate the drawings by the inclusion of such a conventional device.

In the description of the system of the invention, particularly with reference to Figs. 1, 2 and 3, it was simpler to describe the various regulations as if they were more or less independent. It will be understood, however, by those skilled in the art, that the various controls provided in the system, particularly those involving the adjustment of the pitch of the propellers are not independent. For example, when the engine speed exceeds for any reason the speed required by the position of lever 23, the rotating speeds of both propellers and of the supercharger will be increased, governor 21 will operate to change the pitch of propeller 2 in a direction to increase the load on propeller shaft 33. The change of pitch of propeller 2 will react upon propeller 3, causing a further increase in the rotating speed of propeller shaft 34 and of the auxiliary shaft 44. This increase of rotating speed of shaft 44 in turn affects the pressure in the inlet manifold causing regulation by governor 8 of the pitch of propeller 3, which regulation reacts, through propeller 2, on the speed of that propeller. Adjustments of speed lever 23 or of throttle lever 9 or of both together similarly initiate regulation by both speed governor 21 and pressure governor 8. In addition to the above, other factors, such as the speed of the airplane through the air and the level at which the plane is flying also affect the regulation as will be understood by those skilled in the art. Because of the interaction between the governors above briefly indicated, it is particularly important that the various mechanisms employed be provided with means, such as illustrated in Figs. 4, 5 and 7 for preventing "hunting" by providing a transient force varying with the rate of movement of the regulating element for opposing the movement thereof.

I claim:

1. In an airplane, an engine, a supercharger, a pair of controllable pitch propellers, a transmission mechanism for driving the propellers and the supercharger from the engine while maintaining the rotating speed of the supercharger a function of the rotating speeds of the two propellers, means for controlling the pitch of one propeller to maintain the pressure of the gases delivered by the supercharger in accordance with the power requirements, and means for controlling the pitch of the other propeller to maintain the engine speed in accordance with the speed requirements.

2. In an airplane, an engine, a supercharger, a pair of controllable pitch propellers, a transmission mechanism for driving the propellers and the supercharger from the engine while maintaining the rotating speed of the supercharger a function of the rotating speeds of the two propellers, means for controlling the pitch of one propeller to maintain the pressure of the gases delivered by the supercharger in accordance with the power requirements, means for controlling the pitch of the other propeller to maintain the engine speed in accordance with the speed requirements, a source of fuel supply and means for controlling the flow of fuel from said source to the engine in accordance with the engine speed and the power requirements.

3. The combination according to claim 2 wherein said last mentioned means include a volumetric pump for the fuel between said source and the engine, means for driving said pump from said engine, a valve controlling a relief port for the fuel between said pump and the engine and means responsive to the power requirements for controlling said valve.

4. The combination according to claim 2 including manually controlled means for increasing the flow of fuel from said source to the engine independently of the power requirements.

5. In an airplane, an engine, a supercharger, a pair of controllable pitch propellers, a transmission mechanism for driving the propellers and the supercharger from the engine while maintaining the rotating speed of the supercharger a function of the rotating speeds of the two propellers, a throttle lever manually operable to different positions, means responsive to the position of the throttle lever for controlling the pressure of the gases delivered by the supercharger, said means operating through adjustment of the pitch of one propeller, to vary the rotating speed of the supercharger and means responsive to the engine speed for adjusting the pitch of the other propeller.

6. The combination according to claim 5 including a second lever manually operable to different positions, means connected to said second lever and to said speed responsive means for controlling said speed responsive means in response to the position of said second lever.

7. In an airplane, an engine, a supercharger, a pair of controllable pitch propellers, a transmission mechanism for driving the supercharger and propellers from the engine while maintaining the rotating speed of the supercharger a function of the rotating speeds of the two propellers, a throttle lever manually operable to different positions, means for creating a fluid pressure varying in accordance with the position of said throttle lever, means responsive to said fluid pressure and to the pressure of the gases delivered by said supercharger to the engine for controlling the pitch of one of said propellers and speed responsive means for controlling the pitch of the other propeller.

8. The combination according to claim 7 including fuel supply means for the engine and means for controlling the delivery of fuel to the engine from said supply means in response to the speed of the engine and to said fluid pressure.

9. The combination according to claim 7 including a conduit for delivering air to the supercharger, flow restricting means in said conduit and means responsive to said fluid pressure for adjusting said flow restricting means.

10. In an airplane, an engine, a supercharger, fuel supply means for the engine, a pair of controllable pitch propellers, a transmission mechanism for driving said propellers and said supercharger from the engine, said mechanism being of the type wherein the ratio between the speeds of the engine and supercharger is not constant, a throttle lever manually operable to different positions, means responsive to the position of the throttle lever and to the pressure of the gases delivered to the engine for controlling the pitch of one of the propellers, means responsive to the position of the throttle lever and to the engine speed for controlling the supply of fuel to the engine from said supply means and means responsive to the engine speed for controlling the pitch of the other propeller.

11. The combination according to claim 10 including a conduit for delivering air to the supercharger, and means responsive to the position of said throttle lever for restricting the flow of air through said conduit under certain conditions.

12. In an airplane, an engine, a supercharger, a pair of controllable pitch propellers and a transmission mechanism for driving the propellers and the supercharger from the engine while maintaining the rotating speed of the supercharger a function of the rotating speeds of the two propellers, means for controlling the pitch of one propeller to maintain the pressure of the gases delivered by the supercharger in accordance with the power requirements, means for controlling the pitch of the other propeller to maintain the engine speed in accordance with the speed requirements, a conduit for delivering air to the supercharger and means operative when the power requirements are less than a predetermined value for restricting the flow of air through said conduit in accordance with the power requirements.

13. The combination according to claim 12 wherein said last mentioned means include a damper in said conduit, means for creating a fluid pressure which varies with the power requirements and a regulator responsive to said pressure for operating said damper, said regulator including means, when said pressure exceeds a predetermined value, for holding said damper in a wide open position.

14. In an airplane, an engine, a supercharger, a pair of controllable pitch propellers, a transmission mechanism for driving said propellers and said supercharger from the engine while maintaining the rotating speed of the supercharger a function of the rotating speeds of the two propellers, means for creating a master pressure which is a measure of the power requirements, a regulator controlled thereby for adjusting the pitch of one propeller, said regulator comprising a casing, a plate member within the casing, collapsible pressure tight wall members secured to said plate member and to one wall of said casing and defining at least two chambers therewith, means for introducing said master pressure into one of said chambers to act upon one side of said plate member, means connected with the casing for subjecting the other side of said plate member to the pressure of the gases delivered to the engine and means controlled by movement of said plate member upon the unbalance of the opposing pressures acting thereon for adjusting the pitch of said one propeller in a direction to restore balance, and speed responsive means for controlling the pitch of the other propeller.

15. The combination according to claim 14 wherein the collapsible wall members of said regulator define three chambers and wherein said plate member is provided with at least one restricted orifice for admission of the gases delivered to the engine to one of said chambers whereby the resultant compression or expansion of said last mentioned chamber during movement of said plate member tends to oppose the motion thereof with a force varying with the rate of movement of the plate member.

16. The combination according to claim 14 wherein the pitch of said one propeller is electrically controlled and said means controlled by movement of said plate member include a switch element connected to said plate member for energization of the pitch control mechanism upon movement of said plate member.

17. The combination according to claim 14 wherein the pitch of said one propeller is hydraulically operated and said means controlled by movement of said plate member include a cylindrical member coupled to said plate member for longitudinal movement thereby and adapted to control the flow of operating fluid to the pitch control mechanism, said cylindrical member being provided with a pair of helical channels of opposite pitch continuously exposed to the operating fluid for rotation thereby about its longitudinal axis whereby frictional resistance to longitudinal movement of said cylindrical member is minimized.

PIERRE ERNEST MERCIER.